(12) United States Patent
Haber (10) Patent No.: US 10,186,096 B2
(45) Date of Patent: Jan. 22, 2019

(54) VIBRATION RESISTANT DIGITAL VEHICLE CARGO SYSTEM

(71) Applicant: Greg Haber, Woodbury, NY (US)

(72) Inventor: Greg Haber, Woodbury, NY (US)

(*) Notice: Subject to any disclaimer, the term of this patent is extended or adjusted under 35 U.S.C. 154(b) by 94 days.

(21) Appl. No.: 15/470,109

(22) Filed: Mar. 27, 2017

(65) Prior Publication Data

US 2018/0276921 A1 Sep. 27, 2018

(51) Int. Cl.
| | |
|---|---|
| *B60R 25/10* | (2013.01) |
| *G07C 9/00* | (2006.01) |
| *G07C 5/00* | (2006.01) |
| *G07C 5/08* | (2006.01) |
| *E05B 83/16* | (2014.01) |

(52) U.S. Cl.
CPC ...... *G07C 9/00174* (2013.01); *B60R 25/1001* (2013.01); *E05B 83/16* (2013.01); *G07C 5/008* (2013.01); *G07C 5/0858* (2013.01); *G07C 2009/0092* (2013.01); *G07C 2209/62* (2013.01)

(58) Field of Classification Search
CPC .............................................. G07C 2009/0092
USPC ........................ 340/426.28, 542, 545.1, 547
See application file for complete search history.

(56) References Cited

U.S. PATENT DOCUMENTS

| | | | | |
|---|---|---|---|---|
| 3,362,749 | A * | 1/1968 | Clement | B60N 2/78 297/411.21 |
| 7,068,162 | B2 * | 6/2006 | Maple et al. | 340/539.11 |
| 8,004,393 | B2 * | 8/2011 | Haber | 340/426.28 |
| 2002/0171547 | A1 * | 11/2002 | Johnston | G08B 13/06 340/568.1 |
| 2008/0284549 | A1 * | 11/2008 | Bedell | H03K 17/9502 335/170 |
| 2009/0102653 | A1 * | 4/2009 | McGinnis | E05B 45/06 340/551 |

* cited by examiner

*Primary Examiner* — Brent Swarthout
(74) *Attorney, Agent, or Firm* — Epstein Drangel LLP; Robert L. Epstein (57) ABSTRACT

The latch for the cargo door is moveable between an engaged position wherein the door cannot be opened and a disengaged position wherein the cargo door can be opened to access the compartment. A counter displays a number which can be changed in response to an actuation signal. A series of spaced magnets moveable with the latch create a magnetic field which is elongated along the surface of the latch for a given distance. A magnetically actuated reed switch is situated proximate the path of movement of the latch surface, such that the switch remains under the influence of the magnetic field during movement of the latch from its engaged position toward its disengaged position within the given distance and thereafter changes state to generate an actuation signal to the counter.

13 Claims, 7 Drawing Sheets

VIBRATION RESISTANT DIGITAL VEHICLE CARGO SYSTEM

BACKGROUND OF THE INVENTION

1. Field of the Invention

The present invention relates to digital security systems designed to protect cargo in an enclosed cargo compartment of a truck during transport in which a digital counter displays a number which changes in response to movement of the latch of the cargo access door, and more particularly to an improved magnetic door latch for such a system which eliminates false tampering indications due to vehicle movement, including vibrations resulting from irregular road surfaces as the truck travels.

2. Description of Prior Art Including Information Disclosed Under 37 CFR 1.97 and 1.98

U.S. Pat. No. 8,004,393 teaches a security system which indicates whether the enclosed cargo compartment of a vehicle may have been opened during transit. The system includes a lock with a rotatable latch for engaging a stationery member in the floor bed of the truck to maintain the cargo compartment access door in the closed position. A digital counter mounted on the surface of the cargo access door displays a number set after the cargo compartment has been secured by the cargo door lock. A magnetic reed switch situated within the lock housing senses the movement of the latch towards its unlocked position after the cargo area has been secured, and generates an actuation signal which causes the number on the counter to change.

The number set when the cargo door is secured is forwarded to the destination location. The number can sent with the vehicle, for example by entering it on sealed the shipping documents which travel with the vehicle or can be sent separately from the vehicle, such as by transmitting the set number electronically. At the destination location, the person receiving the cargo can determined if the cargo compartment may have been accessed during transit by comparing the set number forwarded to the recipient by the shipper with the number displayed on the counter when the truck reaches the destination location. If the displayed number is different from the set number forwarded by the shipper, the cargo may have been accessed during transit and the cargo may have been tampered with. Based upon that tamper indication, the cargo may be rejected at the destination.

The patented system is intended to replace the physical (plastic or metal) seals which are commonly used to indicate whether the access door to a cargo compartment has been opened during transit. The seal is attached to the latch handle of the cargo access door by the shipper after the truck is loaded with cargo and the door has been locked, before the truck leaves the shipper to travel to its destination. Moving the latch handle to the unlocked position to access the cargo results in the seal being broken. Thus, the broken seal acted as a visual indicator as to whether the cargo access door had been opened during transit. As long as the seal remained intact, the recipient would know that the cargo door had not been opened and the cargo had not been tampered with during transit.

However, the physical seal was not always a reliable indicator of tampering. It is exposed to the elements and can be damaged or broken in transit by external forces unrelated to tampering. As a result, the shipper could refuse the shipment, even though the cargo compartment had not been accessed.

The system of U.S. Pat. No. 8,004,393 provides a more reliable tampering indicator than the physical seal because the entire mechanism is contained within the very strong housing of the cargo access door lock and thus is protected. Since no portion of the system is exposed, there is nothing that can be damaged or broken by external forces during transit.

In the patent system, the latch which engages the stationery member in the truck bed to maintain the cargo access door in the closed position is rotatably mounted within the lock housing. A magnetically actuated switch, also mounted within the lock housing adjacent the latch, acts as a sensor. A magnet is mounted on or embedded in the latch at a location proximate the switch when the latch is in its closed position. Rotating the latch handle to disengage the truck bed member causes the magnet in the latch to move away from the switch, such that the switch is no longer under the influence of the magnetic field of the magnet. That causes the switch to generate an actuation signal to the digital counter. The actuation signal causes the counter to change the displayed number, indicating that the latch handle may have moved and the cargo compartment may have been accessed during transit.

Although the latch in the patented system is spring-loaded toward its closed position, a certain amount of "play" must be present in the mechanism in order to avoid breakage of the lock components due to movement of the truck, including vibration imparted to the truck by irregularities in the road surfaces over which the truck travels. However, even small rotational movement of the latch from its closed position may be sufficient to move the magnet in the latch away from the magnetic switch enough to cause the switch to generate an actuation signal to the counter. That actuation signal results in a change in the displayed number, even though the latch on the access door may not have been moved to its disengaged position. As a result, a false tampering indication is given, which may cause the cargo recipient to reject the cargo even though the cargo compartment was not accessed.

The present invention is designed to improve the patented security system by eliminating or at least greatly reducing the possibility of false tampering indications due to vehicle movement, including vibration or other occurrences not related to the movement of the latch to open the vehicle cargo access door.

BRIEF SUMMARY OF THE INVENTION

It is, therefore, a prime object of the present invention to provide a vibration resistant digital vehicle cargo security system which accurately reflects whether the cargo compartment of a vehicle has been accessed during transit.

It is another object of the present invention to provide a vibration resistant digital vehicle cargo security system in which vehicle movement, including vibration resulting from irregular road surfaces, does not result in false tampering indications.

It is another object of the present invention to provide a vibration resistant digital vehicle cargo security system that utilizes an extended magnetic field along the surface of the latch such that the magnetic field will continue to act on the magnetically actuated switch to prevent generation of an actuation signal as a result of vehicle movement, including vibration due to irregular road surfaces over which the vehicle travels.

It is another object of the present invention to provide a vibration resistant digital vehicle cargo security system in which the extended magnetic field does not interfere with the generation of the actuation signal when the latch is rotated a significant distance from its engaged position.

It is another object of the present invention to provide a vibration resistant digital vehicle cargo security system in which the extended magnetic field is created by multiple spaced powerful rare earth magnets situated in spaced relation along the surface of the latch.

It is another object of the present invention to provide a vibration resistant digital vehicle cargo security system in which the magnets are embedded in the body of the latch.

In general, the above objects are achieved by the present invention which relates to a security system for use on a vehicle having a cargo compartment with an access door. The system includes a mechanical lock including a part with a surface. The part is moveable between a first position wherein the door cannot be opened and a second position wherein the door can be opened to access the compartment. A counter is provided that displays a number which can be changed in response to an actuation signal. Magnetic means which are moveable with the part create a magnetic field elongated along the part surface for a given distance. A magnetically actuated switch is situated proximate the path of movement of the part surface, such that the switch remains under the influence of the magnetic field during movement of the part from its said first position toward its second position within the given distance and thereafter generates the actuation signal to the counter.

The magnetic means causes the counter to display a number when the part is moved toward its first position.

The magnetic means includes two or more spaced magnets situated on the part. The magnets are situated in a line on the part.

The vehicle has a stationery member. The part includes a hook adapted to engage the member in its first position.

The part is rotatable within the housing.

The switch is a reed switch. A support structure is provided for the switch. The switch support has a surface facing the part surface.

In accordance with another aspect of the present invention, a security system is provided for use on a truck having a cargo compartment with an access door and a stationery member. The system includes a mechanical lock including a latch with a surface. The latch is moveable between an engaged position wherein the door cannot be opened because the latch is engaged with the stationery member of the truck and a disengaged position wherein the latch is not engaged with the truck member such that the cargo door can be opened to access the compartment. A counter is provided that displays a number which can be changed in response to an actuation signal. Magnetic means which are moveable with the latch create a magnetic field elongated along the latch surface for a given distance. A magnetically actuated switch is situated proximate the path of movement of the latch surface, such that the switch remains under the influence of the magnetic field during movement of the latch from its engaged position toward its disengaged position within the given distance and thereafter generates the actuation signal to the counter.

The magnetic means causes the counter to display a number when the part is moved toward its engaged position.

The magnetic means includes two or more spaced magnets situated on the latch. The magnets are situated in a line on the latch.

The latch has a hook adapted to engage the truck member in the engaged position.

The latch is rotatable relative to the switch.

The switch is a reed switch.

The system also includes a switch support. The switch support has a surface facing the part surface. The support has a honeycomb configuration.

BRIEF DESCRIPTION OF THE SEVERAL VIEWS OF DRAWINGS

To these and to such other objects that may hereinafter appear, the present invention relates to a vibration resistant digital vehicle cargo security system as described in detail in the following specification and recited in the annexed claims, taken together with the accompanying drawings, in which like numerals refer to like parts and in which:

DETAILED DESCRIPTION OF THE INVENTION

The present invention is designed for use with any type of vehicle that has an enclosed cargo compartment which can be secured by an access door. However, the present invention is primarily intended for use in securing cargo on trucks moving from one location to another location. Accordingly, the invention is disclosed herein as it would be used on a truck with an enclosed cargo compartment secured by a roll-up cargo door having a lock with a latch that includes a J-hook designed to engage a stationery member embedded in the bed or deck of the truck. However, it is to be understood that the invention could be easily adapted by one skilled in the art for use with vehicles other than trucks, with vehicles with other types of cargo access doors, and with cargo doors with other types of locks having rotatable or moveable latches.

Figure 10:
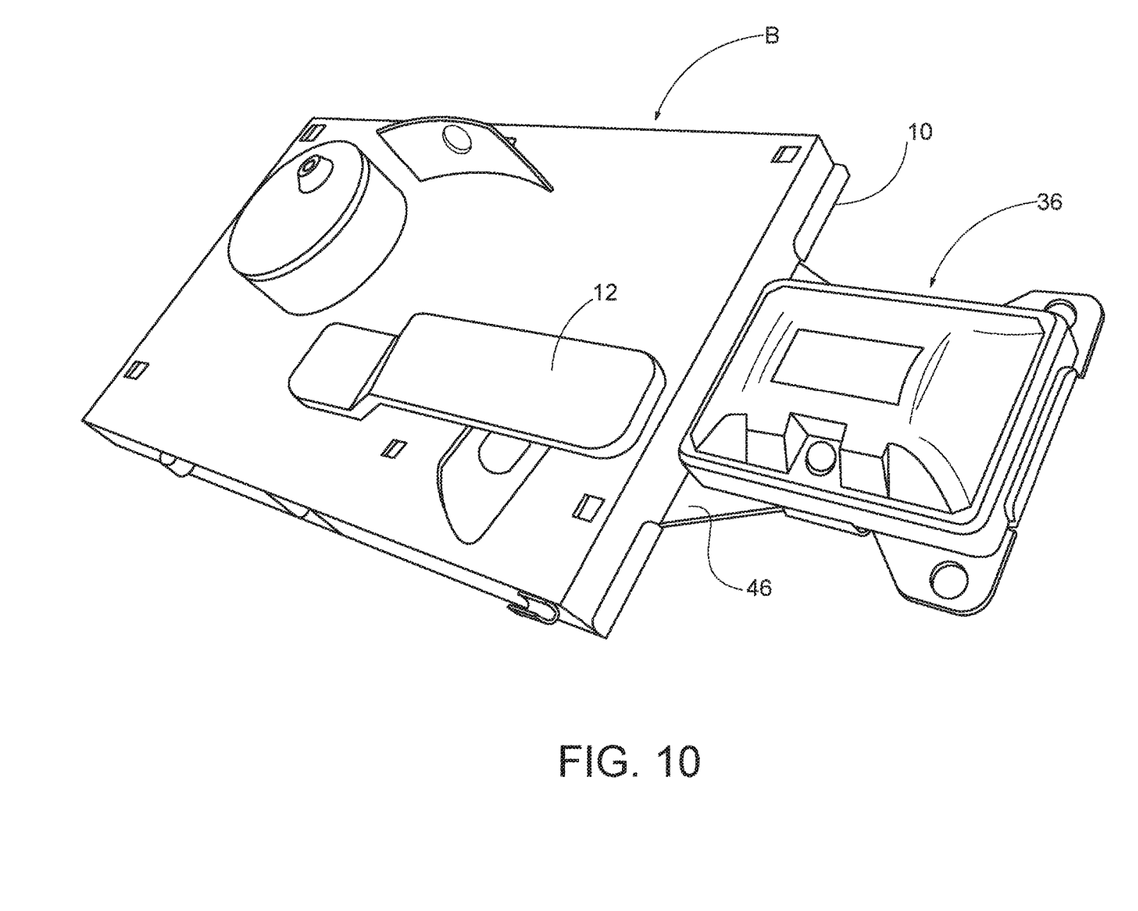
FIG. 10 is a perspective view of the exterior of the cargo access door lock showing the exterior of the housing and the digital counter display.

The digital counter display may be mounted anywhere on the exterior of the truck, but preferably is situated on the cargo door itself. Although the counter may be mounted separately from the lock housing it is most advantageous to provide the counter on a bracket extending from the side of the lock housing as a unit, such that the housing and counter can be bolted to the exterior surface of the door at the same time, as shown in FIG. 10. It is also preferable to mount the digital counter display in a manner so that the wires leading from the switch to the counter are not exposed. Further, it is important that the enclosure for the counter be weatherproof.

The system of the present invention will operate successfully with any type of cargo door lock. However, for purposes of illustration, the system of the present invention is disclosed as it would be used on the roll-up cargo door of a truck with a door lock of the type disclosed in U.S. Pat. No. 7,066,500, issued Jun. 27, 2006 and entitled: "Vehicle Door Lock", which patent is hereby incorporated herein by reference. That lock has a latch/handle assembly which rotates as a unit to cause the J-hook portion of the latch to engage the stationery truck bed member to maintain the door in a closed position or to disengage the stationery truck bed member to allow the cargo door to open.

Figure 1:
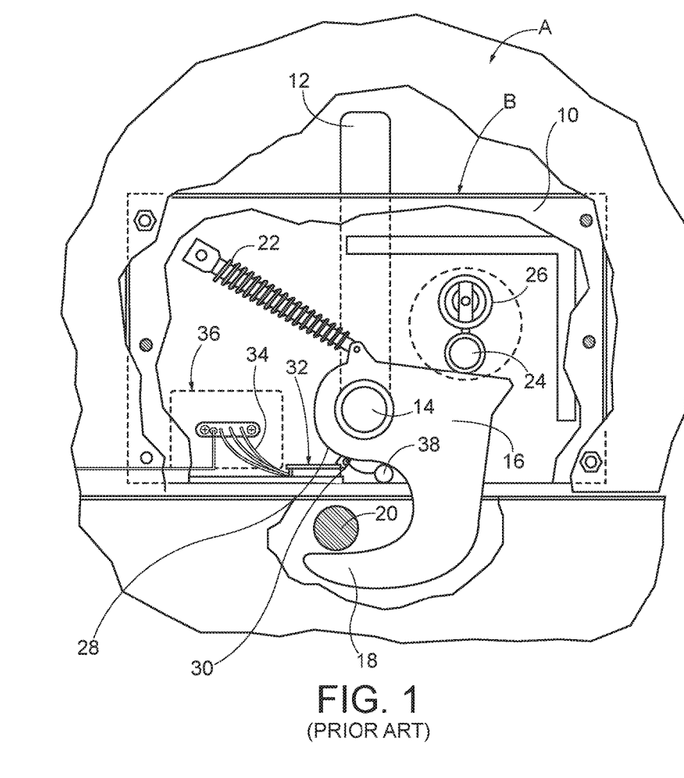
FIG. 1 is a cut-away elevation view from the interior of the cargo compartment of the components of the lock of the digital counter security system of U.S. Pat. No. 8,004,393, showing the latch in its engaged position.

FIG. 1 shows components of the lock of U.S. Pat. No. 8,004,393 as it would appear mounted on a truck with an enclosed cargo compartment and having a roll-up type access door, generally designated A. The cargo door lock, generally designated B, is mounted on the surface of the door. A portion of door A is cut-away such that lock B can be seen.

Lock B includes a housing 10 which is bolted to the door A. A portion of housing 10 is cut-away such that the internal components of the lock are visible. Those components include a handle 12 located on the front wall of the housing. Handle 12 is fixed on a shaft 14 rotatably mounted to the housing such that the handle can be moved through an arc to rotate the shaft. Also fixed on shaft 14 is a latch 16 situated within the housing. The bottom of latch 16 includes a portion which forms a J-hook 18.

J-hook 18 extends through an opening in the bottom of housing 10. Handle 12 is shown in its vertical or upright position. In that position, J-hook 18 engages a stationery part 20 situated in a recess in the truck bed. Movement of handle 12 in a counter-clockwise direction toward a horizontal position will cause latch 16 to rotate with shaft 14 from its engaged position toward its disengaged toward wherein part 20 no longer engages part 20, such that the cargo door may be opened. Latch 16 is urged toward each of its extreme positions by spring/piston 22.

A part 24 is mounted on the interior surface of the wall of the lock for movement in a direction perpendicular to the cargo door between a position intersecting the path of movement of the latch and a position remote from the path of movement of the latch. In this figure, the part is shown in the intersecting position, where the latch is prevented from moving away from is engaged position and the cargo door cannot be opened.

The position of part 24 is controlled by a key-operated lock cylinder 26. When the key is inserted in the cylinder and rotated, part 24 is moved from its intersecting position illustrated in FIG. 1 to a position remote from the path of movement of the latch. That allows movement of the handle to rotate the latch to its disengaged position where J-hook 16 no longer engages part 20 and the cargo door may be opened.

A magnet 30 is mounted on side surface 28 of latch 16. A magnet 30 may be partially or entirely embedded in the latch body. Mounted on the interior surface of the bottom wall of housing 10 is a magnetically controlled reed switch 32. In the engaged position of the latch, magnet 30 is proximate reed switch 32 and the magnetic field created by the magnet influences the reed switch. When the latch is rotated toward its disengaged position, magnet 30 moves away from reed switch 32 such that the magnetic field created by the magnet no longer influences the state of the reed switch.

Wires 34 connect reed switch 32 to a digital counter 36, which is fixed to the front surface of the lock housing. After the cargo compartment is loaded, the cargo access door is closed and the latch is moved to its engaged position to secure the cargo door. As the latch is moved, magnet 30 is moved to a position proximate reed switch 32 in which the magnetic field generated by the magnet influences the reed switch. That causes the reed switch to generate an actuation signal. The actuation signal actuates a random number generator within the counter to generate a random number for display on the counter. That random number is the number which is sent to the destination of the track.

If the latch moves toward its disengaged position during transit, even for a small distance or a short time, magnet 30 will move away from reed switch 32 such that the magnetic field generated by the magnet no longer influences the reed switch. That will cause the switch to generate another actuation signal which will cause the random number generator in the counter to generate and display a different number.

At the destination, the recipient of the cargo will compare the number sent from the original location by loader of the cargo with the number on the counter display. If the numbers are different, the recipient may assume that the cargo compartment may have been accessed and the cargo tampered with in transit and may not accept the cargo.

The present invention is an improvement of the patent system which prevents the movement of the truck, including vibrations resulting from irregular road surfaces encountered during transit, from causing the security system to create false tampering indications. This is accomplished by altering the size and shape of the magnetic field which influences the reed switch. In particular, the magnet field is elongated such that it extends along latch surface 28 for a substantial distance such that small movements of the latch do not result in a reduction of the influence of the magnetic field on the reed switch. Consequently, the reed switch does not change state and does not generate an actuation signal to the counter and the number displayed on the counter does not change.

Figure 2:
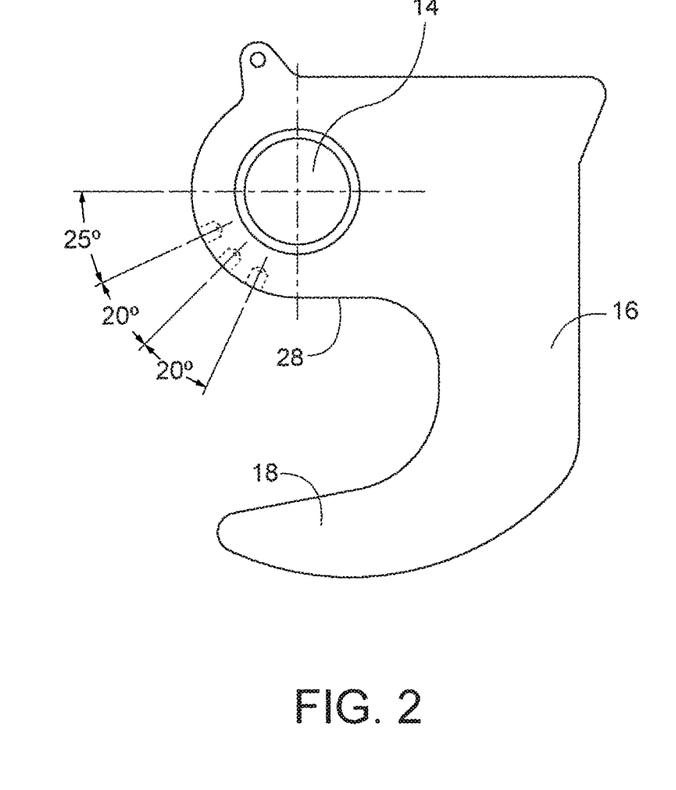
FIG. 2 is an elevation view of the latch of the present invention showing the placement of the magnets.
Figure 3:
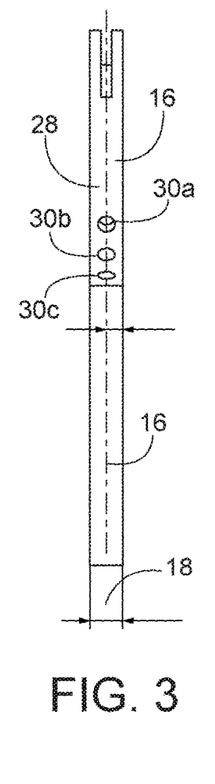
FIG. 3 is an elevation view of the edge of the latch of FIG. 2.

The magnetic field is elongated along the surface 28 of latch 16 by employing a series of discrete strong rare earth magnets 30 as illustrated in FIGS. 2 and 3. Those figures show three magnets 30a, 30b and 30c mounted on or embedded in the latch surface at spaced intervals. However, the number and spacing of the magnets may vary depending upon how much "play" in the system is desired before the counter is actuated to display a different number.

FIG. 2 shows the latch in its engaged position. In that position, magnet 30a is located 25° from the horizontal, magnet 30b is located 45° from the horizontal and magnet 30c is located 65° from the horizontal. With this configuration the latch can rotate as much as 65° from its engaged position before the reed switch will change state and generate an actuation signal.

Figure 4:
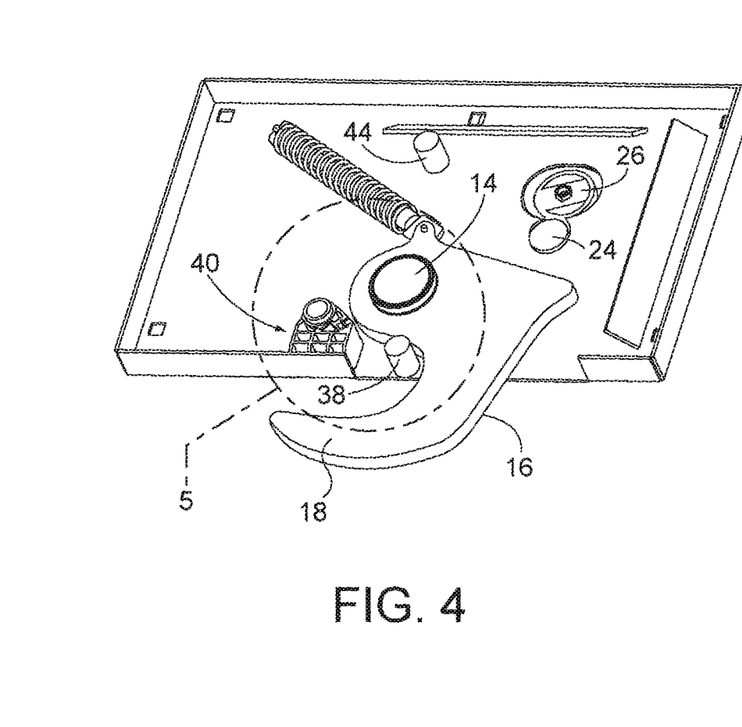
FIG. 4 is a perspective view of the components of the lock with the latch in its engaged position.
Figure 5:
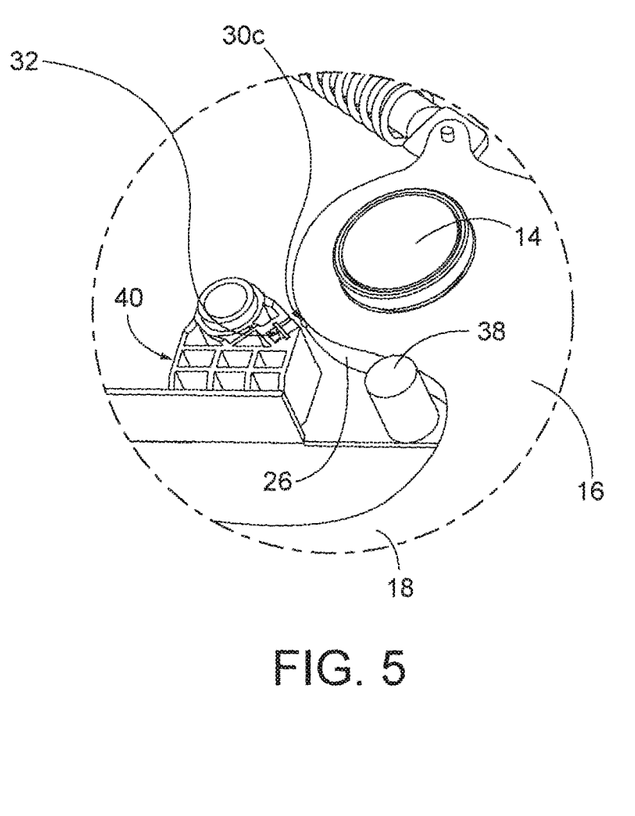
FIG. 5 is an enlarged perspective view of showing a portion of the latch, the magnetically actuated switch and the switch support, with the latch in its engaged position.
Figure 6:
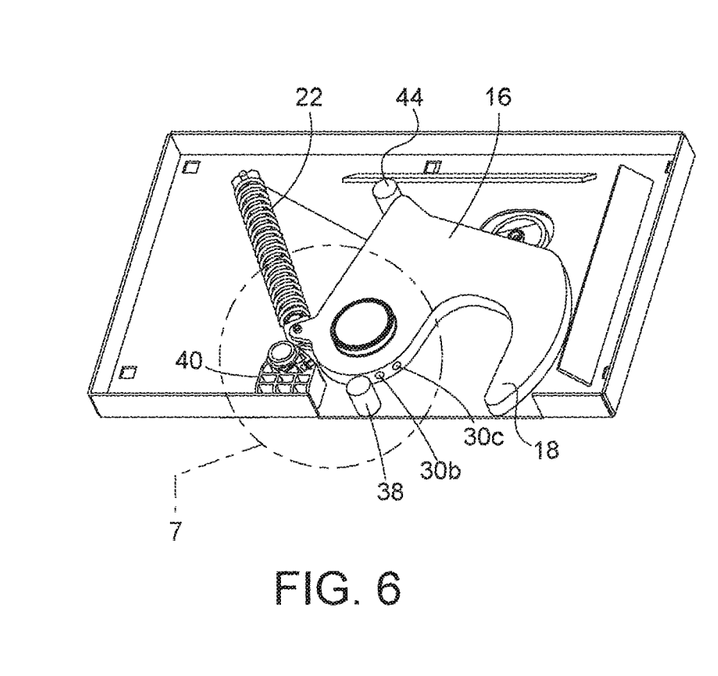
FIG. 6 is a perspective view of the components of the lock, with the latch in its disengaged position.
Figure 7:
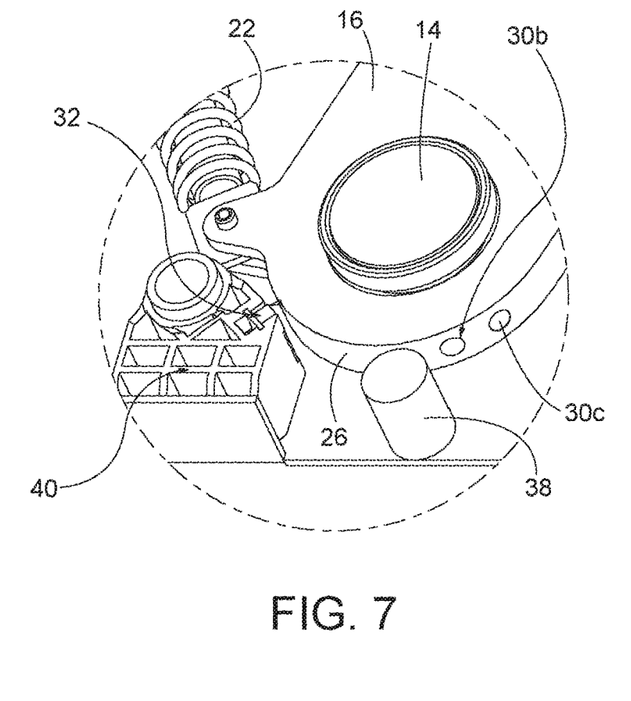
FIG. 7 is an enlarged perspective view showing a portion of the latch, the magnetically actuated switch and the switch support, with the latch in its disengaged position.
Figure 8:
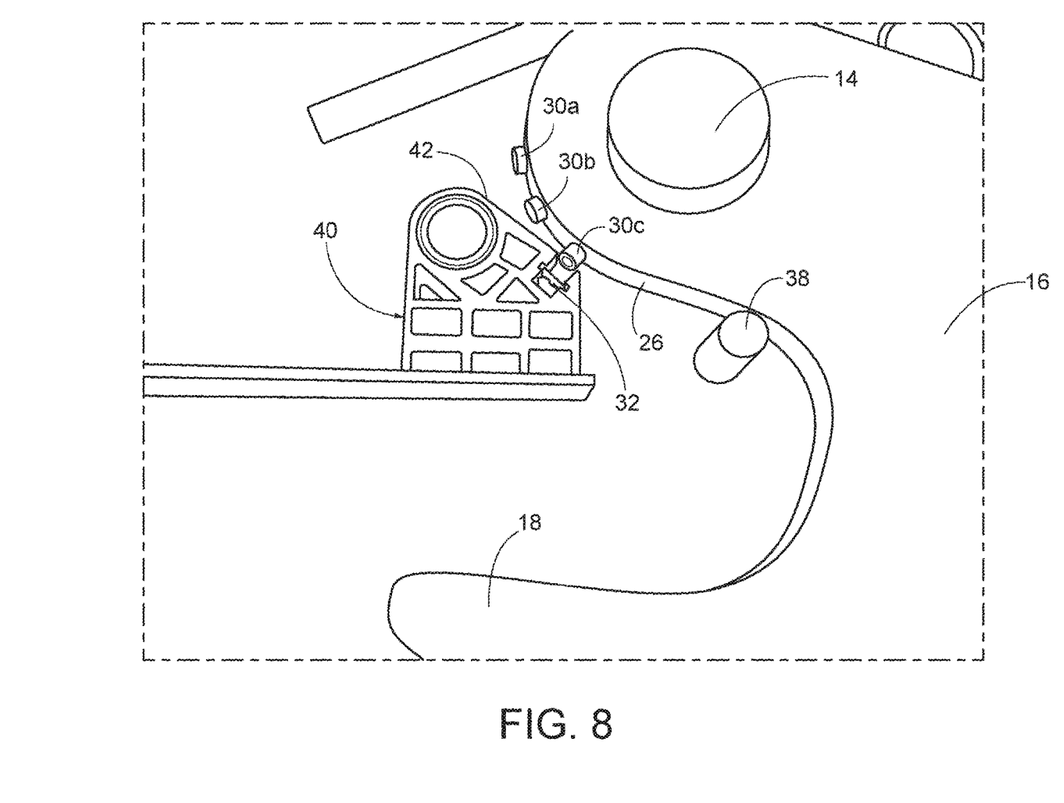
FIG. 8 is a further enlarged perspective view showing the details of the relationship of the magnets relative to the magnetically actuated switch with the latch in its engaged position.

FIGS. 4 through 8 illustrate the relative positions of the magnets and the read switch in greater detail. FIGS. 4, 5 and 8 each show latch 16 in its engaged position. In that position, the magnetic reed switch 32, which situated in a recess in reed switch support 40, is aligned with magnet 30*a*.

As best seen in FIG. 8, switch support 36 is a honey comb member fixed to the interior surface of the bottom of housing B adjacent the J-hook opening and spaced from stop 38, which defines the limit of the engaged position of the latch. Support 36 may be fabricated of metal or plastic and must be strong enough such that the position of the reed switch is fixed.

Support 40 has a surface 42 which faces surface 26 of latch 16 which carries the magnets. Surface 40 is positioned and oriented such that the reed switch 32 is close enough to the magnets carried by the latch, as the latch is moved from its engaged position toward its disengaged position (in this case 65°), to remain within the influence of the elongated magnetic field created by the magnets. Accordingly, within that rotational range of the latch, movement of the latch will not cause the reed switch to generate an actuation signal to the counter.

Figure 9:
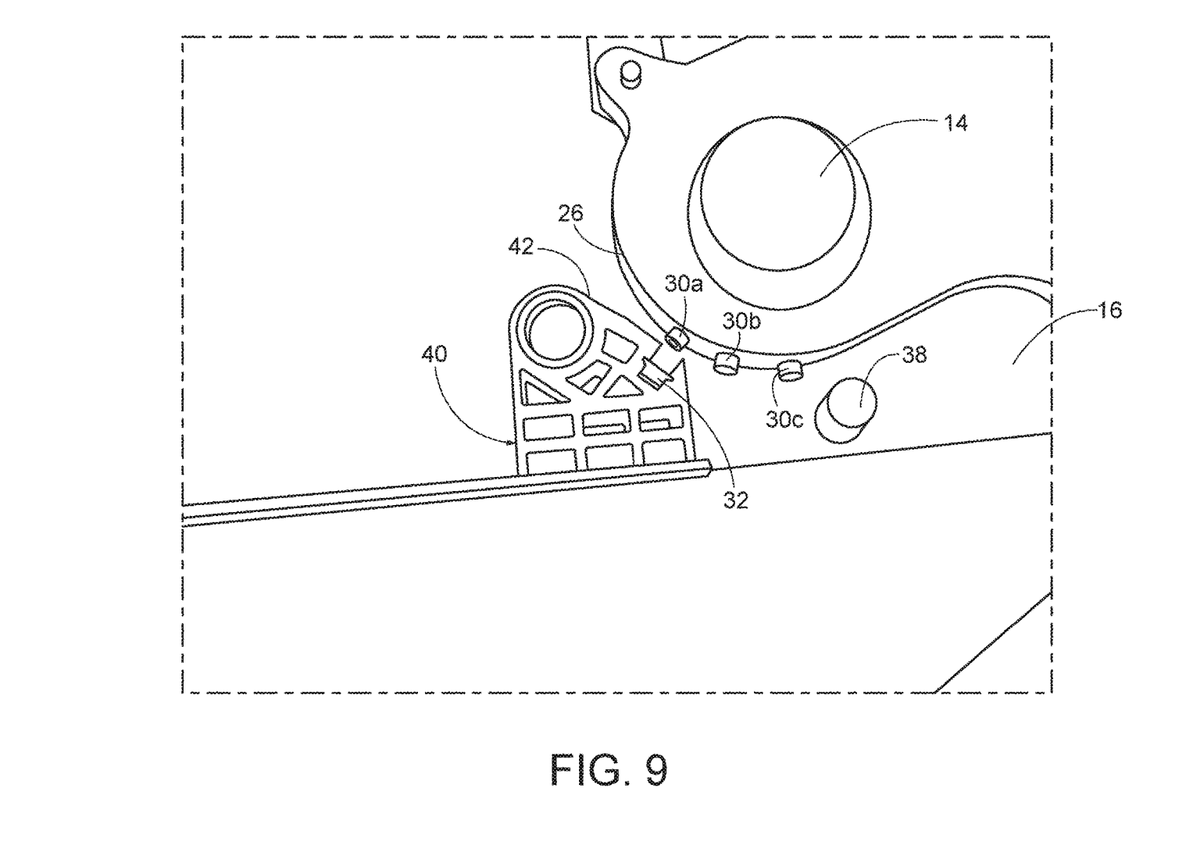
FIG. 9 is a view similar to that of FIG. 8 showing the details of the relationship of the magnets relative to the magnetically actuated switch with the latch rotated toward its disengaged position.

Referring now to FIGS. 6, 7 and 9, those figures show the latch is its disengaged position, defined by stop 44. As the latch moves toward the disengaged position, the influence of the magnetic field on the reed switch will decrease to a point where the state of the reed switch will change causing the reed switch to generate an actuation signal to the counter. In the disengaged position of the latch, the magnets have moved to a position remote from reed switch and the magnetic field created by the magnets no longer has any substantial influence on the reed switch.

The counter is connected to the reed switch by wires (not shown) which extend within the lock housing B, through the side of the housing and into the adjacent counter, without being exposed. FIG. 10 illustrates the exterior of the lock housing B and the counter 36. Counter 36 is attached to the side of housing B by a bracket 46.

While only a single preferred embodiment of the present invention has been disclosed for purposes of illustration, it is obvious that many modifications and variations could be made thereto. It is intended to cover all of those modifications and variations which fall within the scope of the present invention, as defined by the following claims.

I claim:

1. A security system for use on a vehicle having a cargo compartment with an access door, the system comprising a mechanical lock including a rotatable part with an arcuate side surface, said part being rotatable between a first position wherein the door cannot be opened and a second position wherein the door can be opened to access the compartment, a counter visible from the exterior of the vehicle which displays a number which can be changed in response to an actuation signal, magnetic means comprising at least two spaced magnets mounted in a line on said surface creating a magnetic field elongated along said side surface for a given distance, and a magnetically actuated switch situated proximate said side surface, such that said switch remains under the influence of said magnetic field during rotation of said part from said first position toward said second position within said given distance and thereafter generates said actuation signal to said counter.

2. The system of claim 1 wherein said magnetic means causes said counter to display a number when said part is moved toward its first position.

3. The system of claim 1 wherein the vehicle has a stationery member and said part comprises a hook adapted to engage said member in said first position.

4. The system of claim 1 wherein said switch is a reed switch.

5. The system of claim 1 further comprising a switch support.

6. The system of claim 5 wherein said switch support has a surface facing said part surface.

7. A security system for use on a vehicle having a cargo compartment with an access door and a stationery member, the system comprising a mechanical lock including a rotatable latch with an arcuate side surface, said latch being rotatable between an engaged position, wherein the door cannot be opened because the latch is engaged with said stationery member of the vehicle, and a disengaged position, wherein the latch is not engaged with said vehicle member such that the cargo door can be opened to access the compartment, a counter visible from the exterior of said vehicle which displays a number that can be changed in response to an actuation signal, magnetic means comprising at least two spaced magnets mounted on said side surface, said ma nets being situated in a line extending in the direction of latch rotation for creating a magnetic field elongated along said side surface for a given distance, and a magnetically actuated switch situated proximate said side surface, such that said switch remains under the influence of said magnetic field during rotation of said latch from said engaged position toward said disengaged position within said given distance, and thereafter generates said actuation signal to said counter.

8. The system of claim 7 wherein said magnetic means causes said counter to display a number when said part is moved toward its engaged position.

9. The system of claim 7 wherein said latch comprises a hook adapted to engage the stationary member in said engaged position.

10. The system of claim 7 wherein said switch is a reed switch.

11. The system of claim 7 further comprising a switch support.

12. The system of claim 11 wherein said switch support has a surface facing said part surface.

13. The system of claim 11 wherein said support has a honeycomb configuration.

* * * * *